(12) United States Patent
Bahr et al.

(10) Patent No.: US 10,104,056 B2
(45) Date of Patent: *Oct. 16, 2018

(54) METHOD AND NETWORK NODE DEVICE FOR RUNNING PUSH-BUTTON CONFIGURATION SESSIONS WITHIN HETEROGENEOUS NETWORK AND HETEROGENEOUS NETWORK

(71) Applicant: Siemens Aktiengesellschaft, Munich (DE)

(72) Inventors: Michael Bahr, Munich (DE); Rainer Falk, Poing (DE); Parag Mogre, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/334,578

(22) Filed: Oct. 26, 2016

(65) Prior Publication Data

US 2017/0048226 A1     Feb. 16, 2017

Related U.S. Application Data

(63) Continuation of application No. 14/363,005, filed as application No. PCT/EP2012/074740 on Dec. 7, 2012, now Pat. No. 9,578,001.

(30) Foreign Application Priority Data

Dec. 8, 2011  (EP) .................................... 11009708

(51) Int. Cl.
*H04L 29/06* (2006.01)
*H04W 12/06* (2009.01)
(Continued)

(52) U.S. Cl.
CPC .......... *H04L 63/08* (2013.01); *H04L 12/2807* (2013.01); *H04L 41/0813* (2013.01); *H04L 67/10* (2013.01); *H04W 12/06* (2013.01)

(58) Field of Classification Search
None
See application file for complete search history.

(56) References Cited

U.S. PATENT DOCUMENTS

2008/0089300 A1   4/2008   Yee ............................... 370/338
2010/0254314 A1  10/2010   Tsuchiya ....................... 370/328
(Continued)

FOREIGN PATENT DOCUMENTS

CN  101668290 A  3/2010  ............ H04W 12/06
CN  101682879 A  3/2010  ............ H04W 48/12

OTHER PUBLICATIONS

Wi-Fi Protected Setup Specification, Version 1.0, pp. 1-109, Sep. 2006.
(Continued)

*Primary Examiner* — Amir Mehrmanesh
(74) *Attorney, Agent, or Firm* — Slayden Grubert Beard PLLC

(57) ABSTRACT

A heterogeneous home network (with possibly multiple hops between devices) uses a push button configuration mechanism that ensures only one single new network node device is registered for a single push button key press event and overlapping Push-Button Configuration sessions within the heterogeneous network are prevented by an enhanced mechanism for running Push Button Configuration sessions based on a Push-Button Configuration handshake procedure triggered and initiated by a virtual or physical Push-Button-Event on a new device, which wants to join the heterogeneous network for a user friendly security bootstrapping, in which multiple network node devices in the heterogeneous network belonging already to the heterogeneous network are
(Continued)

involved in registering the new device. The Push-Button Configuration handshake procedure is initiated to get a permission information to join the network or to proceed with the Push-Button Configuration or to get a rejection information not to join the network.

20 Claims, 8 Drawing Sheets

(51) Int. Cl.
*H04L 12/24* (2006.01)
*H04L 12/28* (2006.01)
*H04L 29/08* (2006.01)

(56) References Cited

U.S. PATENT DOCUMENTS

| | | |
|---|---|---|
| 2011/0230139 A1 | 9/2011 | Nakahara .................... 455/41.2 |
| 2012/0174197 A1 | 7/2012 | Klein et al. ....................... 726/5 |
| 2012/0230221 A1 | 9/2012 | Radhakrishnan et al. .... 370/254 |
| 2013/0089001 A1 | 4/2013 | Dattagupta .................. 370/255 |
| 2013/0272164 A1 | 10/2013 | Leonardos et al. ........... 370/254 |

OTHER PUBLICATIONS

Wi-Fi Protected Setup Specification, Version 1.0h, pp. 1-110, Dec. 2006.
"IEEE P1905.1 Draft Standard for a Convergent Digital Home Network for Heterogeneous Technologies," IEEE P1905.1™/WDxx.xx.xx, 85 pages, Sep. 27, 2011.
Wi-Fi Protected Setup, URL: http://en.wikipedia.org/wiki/Wi-Fi_Protected_Setup, 3 pages, Nov. 2011.
"Bluetooth," URL: http://en.wikipedia.org/wiki/Bluetooth#Pairing.2FBonding, 22 pages, Dec. 2011.
"IEEE P1.905.1™/D02 Draft Standard for Convergent Digital Home Network for Heterogeneous Technologies," IEEE Communications Society, 80 pages, Dec. 2011.
Nowak, Stefan et al., "Towards a Convergent Digital Home Network Infrastructure," IEEE Transactions on Consumer Electronics, IEEE Service Center, vol. 57, No. 4, pp. 1695-1703 (9 pages), Dec. 27, 2011.
International Search Report and Written Opinion, Application No. PCT/EP2012/074740, 12 pages, dated Mar. 7, 2013.
Wi-Fi Protected SetupTM, URL: http://www.wi-if.org/wifi-protected-setup, 2 pages, Retrieved on Oct. 17, 2014.
European Office Action, Application No. 12798287.4, 7 pages, dated Sep. 8, 2016.
Chinese Office Action, Application No. 201280060208.1, 13 pages, dated Feb. 15, 2017.

METHOD AND NETWORK NODE DEVICE FOR RUNNING PUSH-BUTTON CONFIGURATION SESSIONS WITHIN HETEROGENEOUS NETWORK AND HETEROGENEOUS NETWORK

CROSS-REFERENCE TO RELATED APPLICATIONS

This application is a continuation of U.S. patent application Ser. No. 14/363,005, filed on Jun. 5, 2014, which is the U.S. national stage of International Application No. PCT/EP2012/074740, filed Dec. 7, 2012 and claims the benefit thereof. The International Application claims the benefit of European Application No. 11009708.6 filed on Dec. 8, 2011, all applications are incorporated by reference herein in their entirety.

BACKGROUND

Described below is a method for running Push-Button Configuration sessions within a heterogeneous network, a network node device for running Push-Button Configuration sessions within a heterogeneous network, a computer readable storage media executable by a processor to run Push-Button Configuration sessions within a heterogeneous network and a heterogeneous network for running Push-Button Configuration sessions.

The current data-centric use of networks (Internet access, media streaming) is increasingly extended towards home control functionality (home automation for climate control, lighting, burglar alarm, home energy network). Such home networks use according to FIG. 1 for instance various communication network technologies like Ethernet (IEEE 802.3), WLAN/WiFi (IEEE 802.11), and Power Line Communication (PLC; IEEE 1901). For this reason they are heterogeneous The standard IEEE P1905.1, which is currently under development, defines a home network standard supporting different network technologies by a specified "IEEE P1905.1"-Abstraction Layer.

FIG. 2 shows the design of the abstraction layer based on the ISO/OSI-Reference Model with a management and data plane. The abstraction layer is embedded in an IEEE P1905.1-Architecture above a Media Access Control (MAC)-layer and a Physical layer as part of a "Network Node Device" NND within the heterogeneous network. Thus, the network node device NND uses the cited technologies like Ethernet (IEEE 802.3), WLAN/WiFi (IEEE 802.11), and Power Line Communication (PLC; IEEE 1901) and additionally a technology according to the specification of the Multimedia over Coax Alliance (MoCA) via corresponding interfaces according to FIG. 2. It is not compulsory or mandatory for a typical network node device to support all cited communication technologies. It is possible that the network node device NND supports only one or two of the cited technologies or completely other network technologies. Thus the network node device NND supports at least one network technology.

At least one goal of the IEEE P1905.1 standardization activities is the security mechanism during a setup or registration of a new device, called an "enrollee", which wants to join the heterogeneous network. The security mechanism is needed to protect the home network from external attacks. Such security mechanisms have to be configured with a security credential (password, passphrase, cryptographic key) that is burdensome to set-up manually.

Therefore there is a need for an easy user-friendly setup of a security credential for a network supporting different communication network technologies such as using a push button configuration method.

The specific problem of using a push-button configuration in an IEEE P1905.1 network comes from the fact that multiple devices (belonging even to different technologies and possibly connected via multiple hops) are activated to accept a new device. So in the current version of the standard, more than one device could register with the IEEE P1905.1 network after a single button press. An attacker node device may therefore register undetected when an authorized registration of the new device takes place.

Section 9 of the current IEEE P1905.1 draft version "1905_1-11-0067-00-WGDC-proposal-for-cdhn-standard.doc" defines rudimentary signalling procedures for an automatic cross-technology security setup. However, important functionality is missing so far.

The closest technical solution is defined Wi-Fi Protected Setup (WPS). Described is a monitoring for simultaneous push-button configurations. If a session overlap is detected, the PBC configuration fails.

There exist different technologies for user-friendly security set-up specific for a single technology.

Bluetooth defines Pairing procedures (legacy and secure simple pairing) to set-up a secret key between two Bluetooth devices (see en.wikipedia.org/wiki/Bluetooth#Pairing.2FBonding).

Wi-Fi Protected Setup (WPS) defined by the Wi-Fi Alliance is the de-facto standard for WLAN security setup (see en.wikipedia.org/wiki/Wi-Fi_Protected_Setup and www.wi-fi.org/wifi-protected-setup). As part of the Push Button Configuration (PBC) protocol run, a check for an overlapping session is performed. If an overlapping PBC session is detected, the set-up procedure is aborted. The simultaneous announcement by a single device on two frequency bands is not considered as session overlap.

According to the WPS Specification 1.0 Section 10.3, page 77 the following is known:

The button press or equivalent trigger event on the enrollee causes it to actively search for a Registrar in PBC mode. However, the enrollee must not proceed immediately with the registration protocol when it first discovers a registrar, which is a network node device authenticated for the network and registering the new device. Instead, the enrollee must complete a scan of all IEEE 802.11 channels that it supports to discover if any other nearby registrar is in a Push Button Configuration mode (PBC mode). The enrollee performs this scan by sending out probe requests with a device password identifier (ID) indicating that the enrollee is in the PBC mode and receiving probe responses indicating a selected registrar with a PBC device password ID. During this scan, the enrollee must abort its connection attempt and signal a "session overlap" error to the user if it discovers more than one registrar in the PBC mode. If a session overlap error occurs, the user should be advised through the enrollee or the registrar user interface (UI) or product literature to wait some period of time before trying again.

Note: In the case of a dual-band access point (AP) and a dual-band station, the station may discover more than one registrar in the PBC mode. If the dual-band station does discover more than one registrar in the PBC mode, one each RF band, and the Universal Unique IDentifier (UUID) in the beacon and probe-response are the same for all RF bands, then the station shall not consider this to be a session overlap.

FIG. 3 shows the message chart (WPS PBC Message Exchange) for push-button configuration involving the new device to be registered (called Enrollee), an access point (AP) being in direct communication with the Enrollee, and a Registrar that actually performs the registration (i.e. it establishes a credential with the Enrollee). The registration messages (M1 . . . M8) are embedded in EAP messages that are forwarded by the AP. Before the actual registration starts, a monitoring is performed to detect an overlapping PBC session: After button press B_E by the Enrollee, the Enrollee sends Probe Request messages indicating that it is in the PBC mode. The AP forwards the information to the Registrar. After a button press B_R or an equivalent trigger event on the Registrar, the Registrar checks whether more than one Enrollee PBC Probe Request has been received by the Registrar within 120 seconds prior to the PBC button press on the Registrar (PBC Monitor Time). If more than one Enrollee PBC Probe Request has been received within the Monitor Time interval, the Registrar signals a session overlap error and refuses to enter the PBC mode or perform a PBC-based Registration Protocol exchange. In general, the two buttons B_E and B_R may be pressed in any order as long as both are pressed within a 120 sec time interval. Note: The message "SetSelectedRegistrar" notifies the AP that the Registrar is currently in the PBC mode. So this message causes the change in behaviour of the AP that it answers with a PBC Probe Response message (positive answer instead of negative answer).

This technical solution has as main drawback that it is suitable only for a limited usage scenario:

Only a single technology (WLAN) is supported.

The case of multiple access points (nodes) belonging to the same (home) network and each of them being potentially used for the PBC is not considered.

"Appendix A" in WPS Specification 1.0 Section 13 describes a setup in which multiple registrars are supported, so that the user (enrollee) has to select with which registrar it wants to register.

The current IEEE P1905.1 draft version "1905_1-11-0067-00-WGDC-proposal-for-cdhn-standard.doc" includes the following description for the push button configuration in section 9.2.2 (P1905.1 PBC (Push Button Configuration) Setup Method):

The IEEE P1905.1 PBC method works between two IEEE P1905.1 devices on the same IEEE P1905.1 Network, even when these two devices do not include an IEEE P1905.1 interface of the same underlying network technology if they are bridged by a device with the same underlying network technologies.

An example of the IEEE P1905.1 PBC method is illustrated in FIG. 4 (Example of IEEE P1905.1 Push Button Event Notification and IEEE P1905.1 Push Button Configuration).

In section 9.2.2.1 "P1905.1 Push Button Event Handling" of the current IEEE P1905.1 Draft Version "1905_1-11-0067-00-WGDC-proposal-for-cdhn-standard.doc" it is said: The handling of IEEE P1905.1 Management messages in IEEE P1905.1 Devices is a common behaviour (powering up the interfaces and generating a sequential message ID across all message types from the device).

If the physical or logical PBC button is pushed on an IEEE P1905.1 Device and if an underlying network specific Push Button Configuration sequence is not currently being performed on any of the network interfaces of this IEEE P1905.1 Device, then a Push Button Event is triggered on an IEEE P1905.1 Device If a Push Button event is triggered on an IEEE P1905.1 Device, then the Application Layer Management Entity (ALME) shall:

Generate an eventID for this Push Button Event

Send a Push_Button_Event Notification IEEE P1905.1 Multicast message over its Authenticated IEEE P1905.1 Links using § 7.2 Relay Multicast Transmission Procedures Initiate the underlying network specific Push Button Configuration sequence on the IEEE P1905.1 interfaces supporting Push Button Configuration methods.

FIG. 5 describes how an IEEE P1905.1 Device handles an IEEE P1905.1 Push Button Event Notification message (Push Button Event Notification Handling).

The handling of IEEE P1905.1 Management messages in an IEEE P1905.1 Device is a common behaviour (powering up the interfaces and generating a sequential message ID across all message types from the device).

If an ALME receives an IEEE P1905.1 Push Button Notification message, then an IEEE P1905.1 ALME shall:

1) If an underlying network specific Push Button Configuration sequence is currently being performed of any of the network interface of the device, then ignore the message.

2) If the message SourceAddress and eventID are a duplicated notification for this given P1905.1 Push Button event, then ignore the message.

The aging of a SourceAddress and eventID pair is P1905.1_PBC_WALK_TIME.

P1905.1_PBC_WALK_TIME should be defined to be longer than the underlying network.

No more than a single eventID need to be stored by the P1905.1 device since Push_Button_Event cannot be triggered or handled if an underlying network Push Button Configuration is in progress (cf. 3.2.3 & 3.2.5-1).

3) If message is not ignored, repropagate the received IEEE P1905.1 Push_Button_Event Notification message using § 7.3 Relay Multicast Reception Procedures.

4) Initiate the underlying network specific Push Button Configuration sequence on all IEEE P1905.1 interfaces supporting Push Button Configuration methods.

From the IEEE P1905.1 draft version "1905_1-11-0067-00-WGDC-proposal-for-cdhn-standard.doc" it is further implicitly known that according to FIG. 6 (Push button configuration in IEEE P1905.1) a push button event on one network node device D1 belonging to a home network activates a push button configuration mode on other nodes belonging to the home network. Network node devices D1 . . . D4 are part of the existing IEEE P1905.1 network (authenticated IEEE P1905.1 devices). The network node device D1 sends a push button notification message PBN to some or all other network node devices belonging to the home network (the message may be sent directly or forwarded by an intermediate network node device). The PBN message as specified in the current version of the IEEE P1905.1 draft standard contains TLV type, message type, event id fields. A technology-specific push button configuration protocol (PBC) is executed between a new device ND (not yet part of the home network) and the device D3. After finishing the technology-specific PBC protocol, the new device ND is part of the home network and a new network node device.

FIG. 7 (Push button configuration in IEEE P1905.1 showing an attacker node AN) shows based on FIG. 6 an example of an attack scenario. An attacker node device AN runs a push button configuration protocol as well, here with the network node device D4. So, after finishing the PBC protocol, the attacker network node device AN is now part of the home network. As different nodes may use even heterogeneous communication technologies, and therefore different technology-specific PBC protocols, the network node device D3 (and the new device ND) may not even detect the second PBC protocol run.

SUMMARY

Described below are a method and a network node device for running Push-Button Configuration sessions within a heterogeneous network and a heterogeneous network using a push button configuration mechanism suitable for a heterogeneous home network (with possibly multiple hops between devices) that ensures that only one single new network node device is registered for a single push button key press event. Thus overlapping Push-Button Configuration sessions within a heterogeneous network are prevented.

The method may be implemented by a network node device, or computer readable storage media executable by a processor in a heterogeneous network.

The method uses an enhanced mechanism for running Push Button Configuration sessions based on a Push-Button Configuration handshake procedure triggered and initiated by a virtual or physical Push-Button-Event on a new device, which wants to join the heterogeneous network, for a user friendly security bootstrapping, in which multiple network node devices, especially of different communication technologies and possibly connected over multiple hops, in the heterogeneous network belonging already to the heterogeneous network, e.g. because of a previous successful authentication, are involved in registering the new device (enrollee). Thus on one hand, each network node device could be principally adapted to be an originator network node device, which broadcasts a notification message to other authenticated network node devices triggered by a virtual or physical Push-Button-Event being released on the originator network node device before. On the other hand, the originator network node device could process the registration of the new device alone or with the support of at least one other authenticated network node device. In each case the Push-Button Configuration handshake procedure is initiated in order to get a permission information to join the network or to proceed with the Push-Button Configuration or a rejection information not to join the network.

In the case of the rejection information not to join the network the rejection could be existing therein that either explicitly a dedicated information is expressed with the rejection or implicitly nothing (no information) is expressed with the rejection. The latter means that there is neither a permission information nor a rejection information, but it is considered, according to the method described herein, as a rejection.

Described below is how information to start a "Push-Button Configuration"-Protocol is used with the new device (cf. FIGS. 8 and 9) and a time triggering and/or time monitoring based signalling of a permission information to join the network or to proceed with the Push Button Configuration or a rejection information not to join the network each assigned to and/or conveyed by the Push-Button Configuration handshake procedure the originator network node device is involved in without the support of the at least one other authenticated network node device. Also described below is how information to start a "Push-Button Configuration"-Protocol, a request message requesting to run the "Push-Button Configuration"-Protocol with the new device and, an assign message containing permission information to join the network or to proceed with the Push Button Configuration or an abort message containing rejection information not to join the network, each assigned to and/or conveyed by the Push-Button Configuration handshake procedure the originator network node device is involved in with the support of the at least one other authenticated network node device.

The permission information to proceed with the Push-Button Configuration covers the special case (cf. FIGS. 8 and 9) that the "Push-Button Configuration"-Protocol is started before the originator network node device makes the decision that the new device can join the network. In this context the permission information to proceed with the Push-Button Configuration means that the new device can join the network and that the started "Push-Button Configuration"-Protocol should be proceeded.

The permission information to join the network covers the special case that the "Push-Button Configuration"-Protocol is not started before the originator network node device makes and communicates the decision that the new device can join the network. In this context the permission information to join the network means that the new device can join the network by starting and running the "Push-Button Configuration"-Protocol at a network node device authenticated for the network.

Thus according to an embodiment the problem is solved by ensuring that by a single push button trigger event only a single network node device of the heterogeneous home network executes a push button configuration protocol run. This is realized by a two phase approach:

First, a push button event is announced within the heterogeneous network by an extended push button event notification message (PBN, PBE Notification). A network node device of the heterogeneous network (e.g., a first or second network node device) that wants to start a PBC protocol (e.g. as it has been probed for PBC mode by a new device), signals this information to the originator network node device of the IEEE P1905.1 push button event notification message by sending a Push Button Event Request message (PBReq, PBE Request). A single network node device of the heterogeneous home network is assigned the permission to perform a PBC protocol by the originator network node device of the IEEE P1905.1 Push Button Event Notification message by sending a Push Button Event Assignment message (PBAsgn, PBE Assignment).

A simple push button configuration mechanism can be securely used in a heterogeneous home network having multiple nodes supporting a push button configuration mechanism (i.e. there exists not only a single access point within the home network as it is assumed today). A secure push button configuration can be performed in heterogeneous home networks, i.e. in which different communication technologies as e.g., Ethernet, WLAN, PLC, etc. are used simultaneously.

Additionally by using the proposed mechanism, security loopholes, which would permit an attacker node to join an existing heterogeneous home network by using a PBC protocol which overlaps with a regular PBC protocol, are closed (cf. FIG. 9 where the PBC is aborted when an attacker node tries to initiate an overlapping PBC) because parallel PBC protocols are detected. Further using the alternatives specified below, the nodes which initiated the PBC can be uniquely identified allowing the possibility to have a successful PBC for an authorised node even in the presence of an attacker node.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
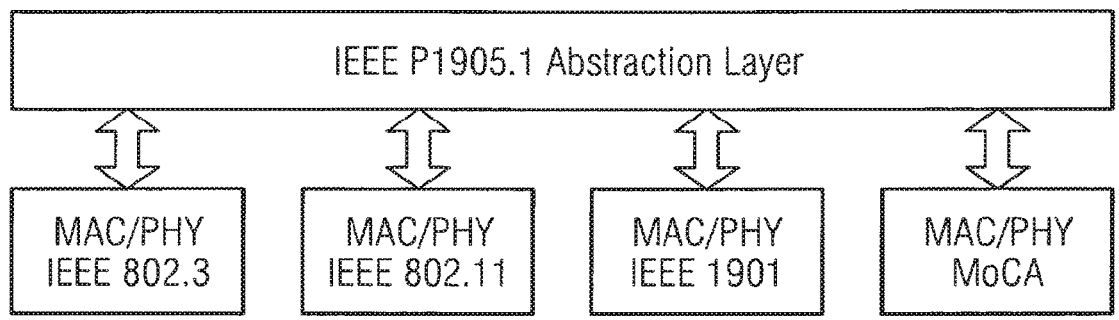
FIG. 1 is a block diagram illustrating how standard IEEE P1905.1 supports different network technologies like Ethernet (IEEE 802.3), WLAN/WiFi (IEEE 802.11), and Power Line Communication (PLC; IEEE 1901) in a heterogeneous home network.

Reference will now be made in detail to the preferred embodiments, examples of which are illustrated in the accompanying drawings, wherein like reference numerals refer to like elements throughout.

Figure 2:
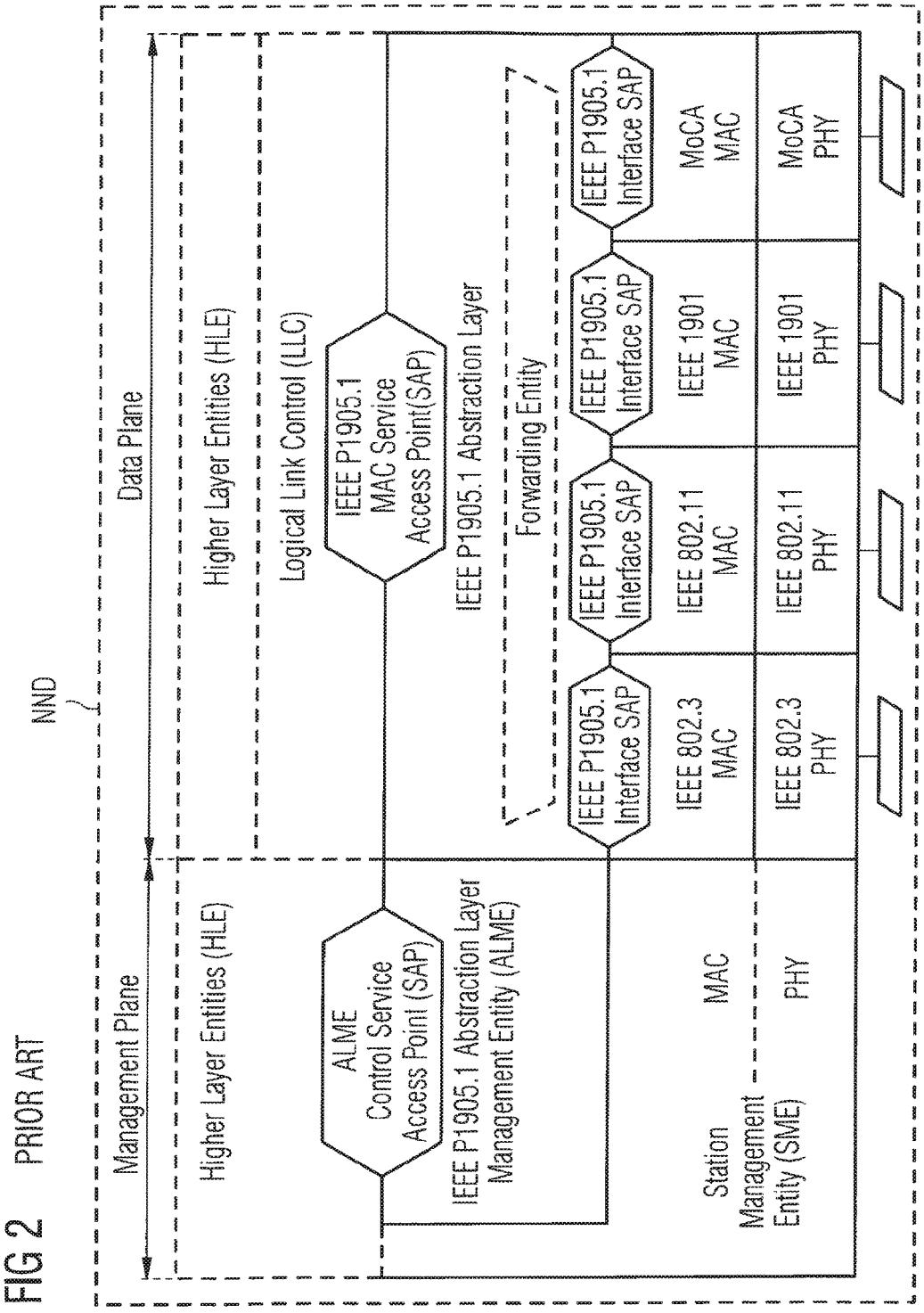
FIG. 2 is an abstraction layer diagram based on the ISO/OSI-Reference Model with a management plane and a data plane.
Figure 3:
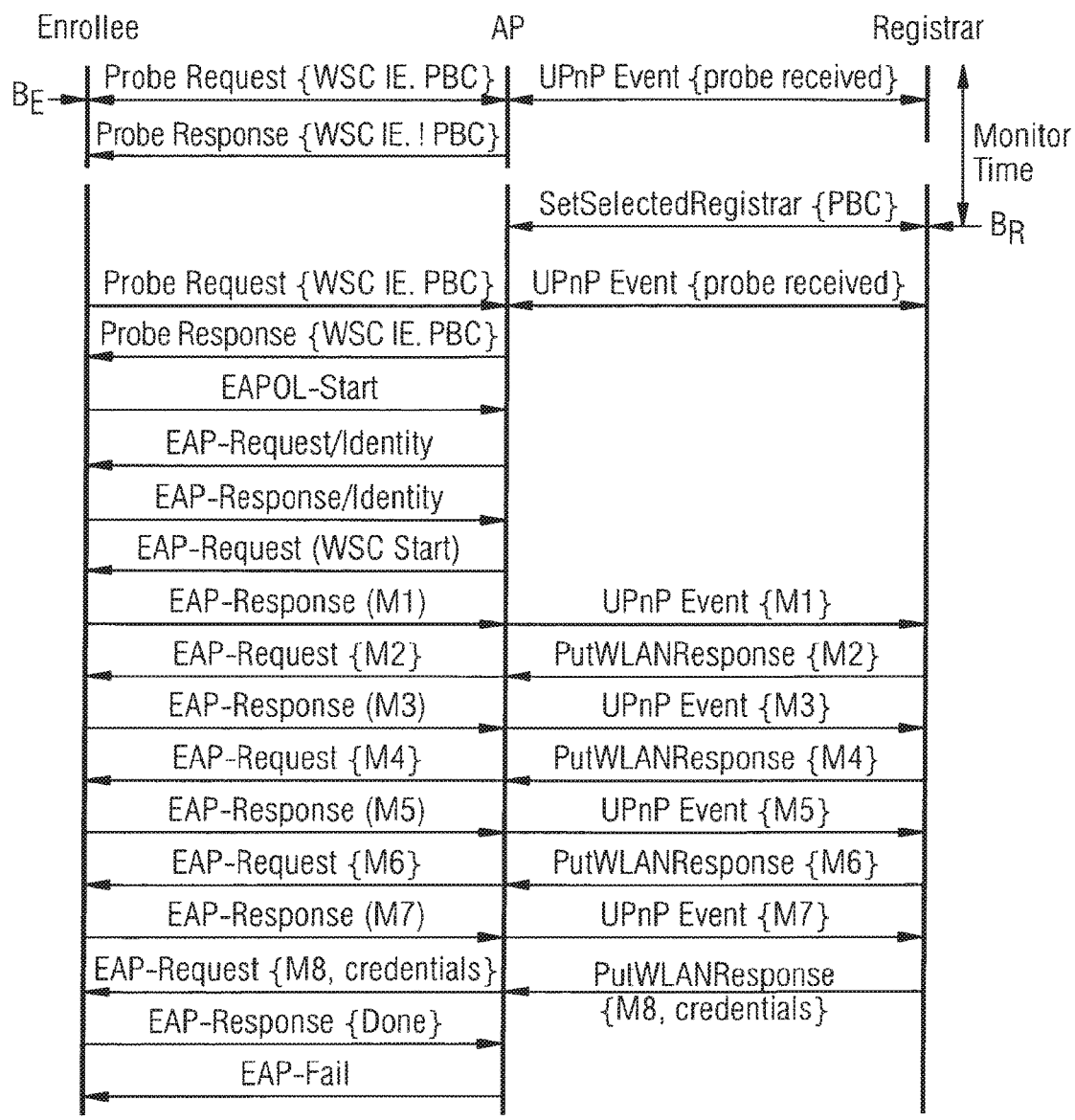
FIG. 3 is a message chart for push-button configuration involving a new device to be registered, an access point in direct communication with the new device, and a registrar that performs the registration.
Figure 4:
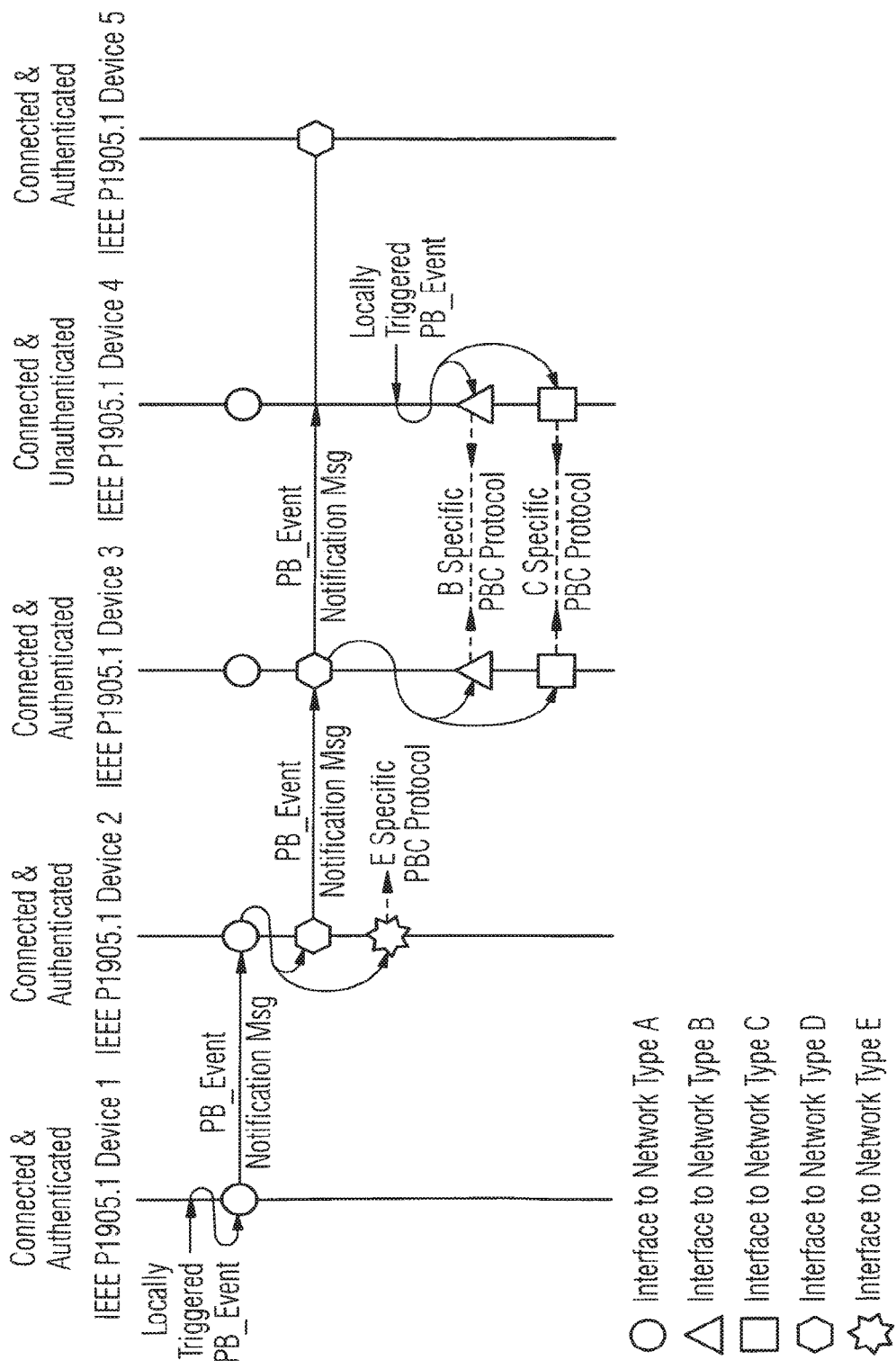
FIG. 4 is a signalling flow diagram for IEEE P1905.1 Push Button Event Notification and IEEE P1905.1 Push Button Configuration.
Figure 5:
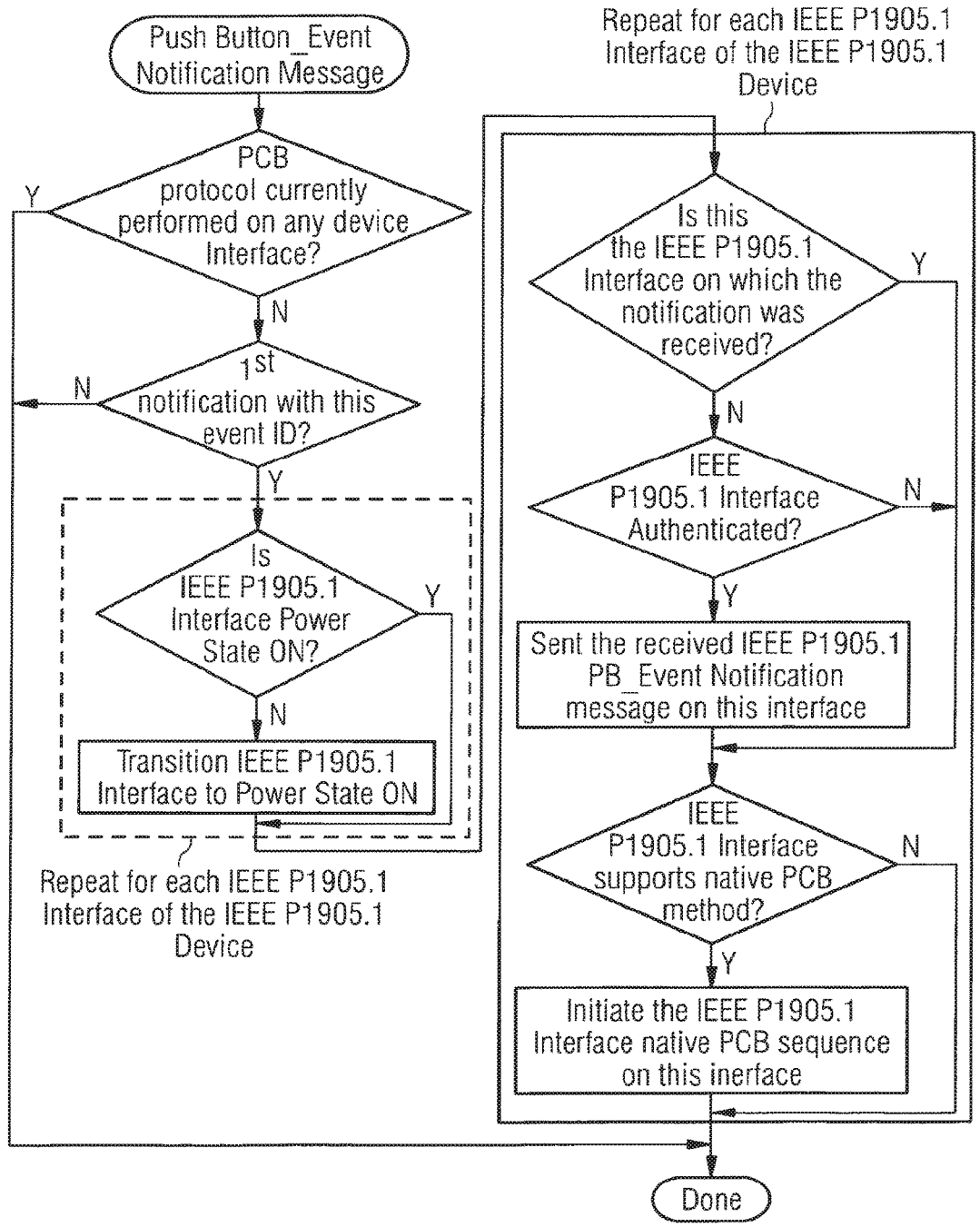
FIG. 5 is a flowchart illustrating how an IEEE P1905.1 device handles an IEEE P1905.1 Push Button Event Notification message.
Figure 6:
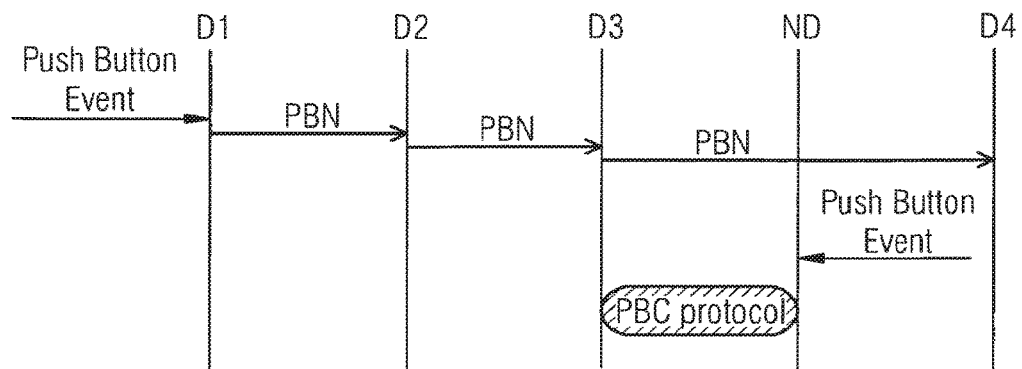
FIG. 6 is a signalling flow diagram for a push button configuration in IEEE P1905.1.
Figure 7:
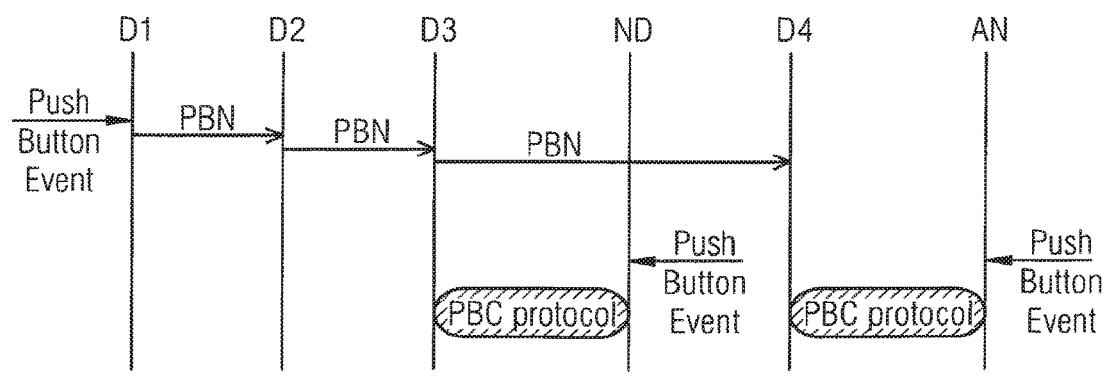
FIG. 7 is a signalling flow diagram for a push button configuration in IEEE P1905.1 showing an attacker node.
Figure 8:
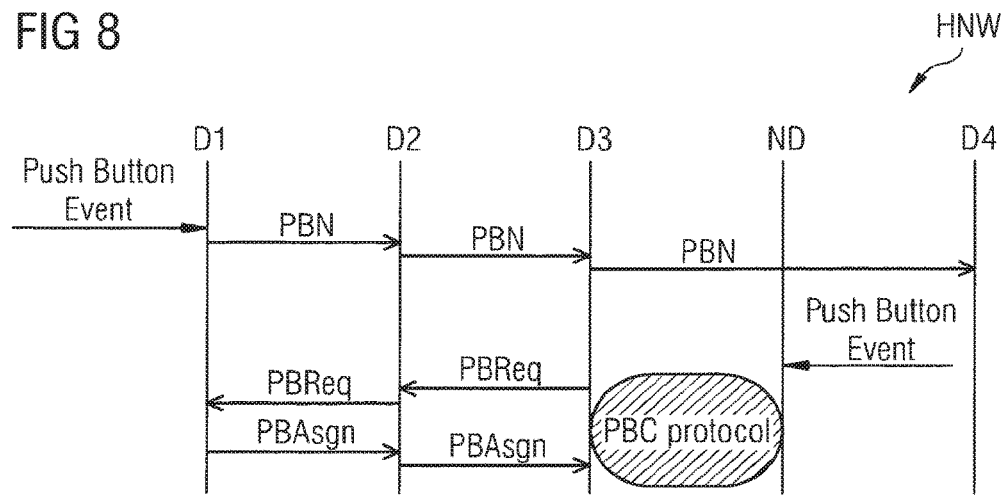
FIG. 8 is a signalling flow diagram for an Extended Push Button Configuration
Figure 9:
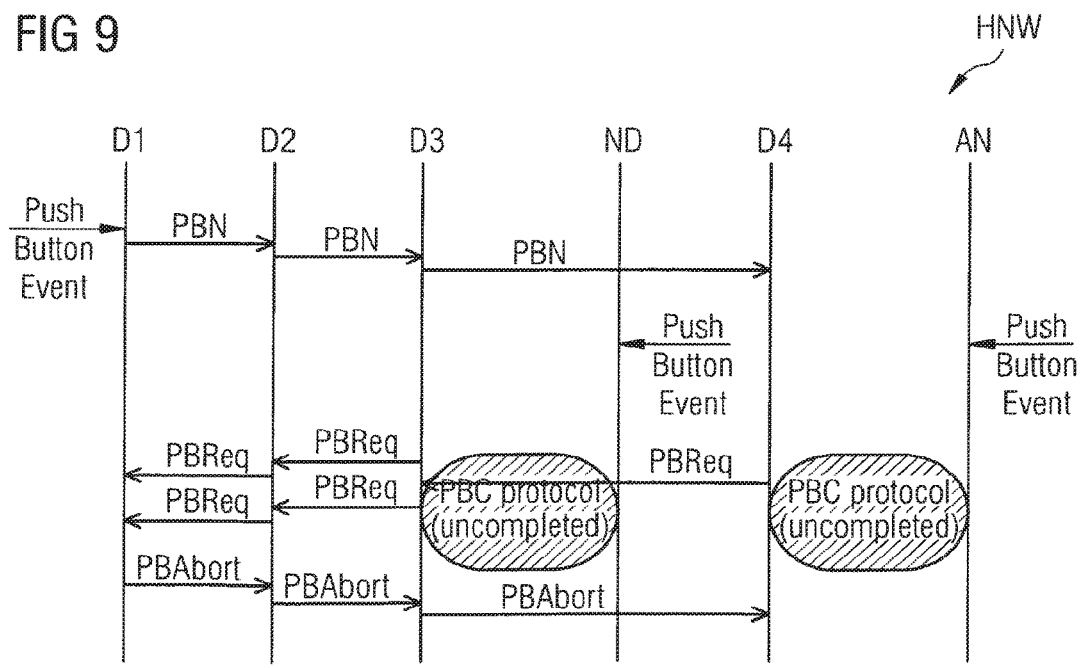
FIG. 9 is a signalling flow diagram for an Extended Push Button Configuration with an Abort Mechanism.
Figure 10:
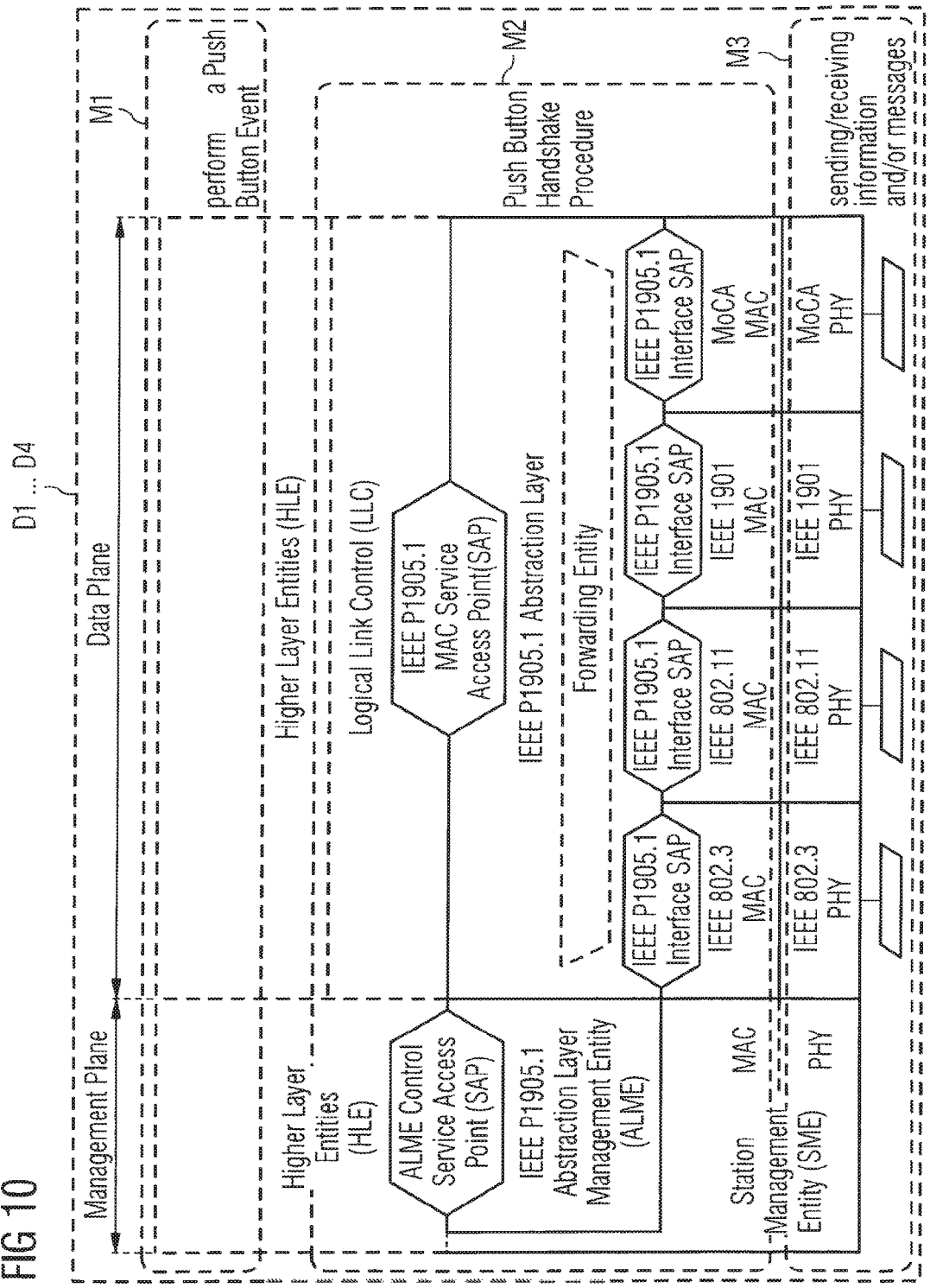
FIG. 10 is an abstraction layer diagram of a network node device for processing the extended Push Button Configuration based on the abstraction layer embedded in the IEEE P1905.1-Architecture above the Media Access Control (MAC)-layer and the Physical layer.

An embodiment will be described according to the FIGS. 8, 9 and 10 in which FIG. 8 illustrates an Extended Push Button Configuration; FIG. 9 illustrates an Extended Push Button Configuration with an Abort Mechanism; and FIG. 10 illustrates the structure of a network node device for processing the extended Push Button Configuration based on the abstraction layer embedded in the IEEE P1905.1-Architecture above the Media Access Control (MAC)-layer and the Physical layer according to FIG. 2.

FIG. 8 shows a Push-Button Configuration session running in a heterogeneous network HNW with a plurality of network node devices D1 . . . D4, ND interconnected to each other via at least one interface and/or over multiple hops thereby exchanging several Push Button Configuration messages. The push button event is announced by a first network node device D1 within the home network by sending at least one Push Button Notification (PBN) message. A second network node device D3 detects a new device ND (third network node device) that wants to perform a Push Button Configuration (PBC). For example, in WLAN Simple Config, a probe request including a PBC information element sent by the new device ND may be received by the second network node device D3. Before continuing with the PBC protocol, the second network node device D3 requests the permission to run the PBC protocol by sending a push button request message PBReq, here to the first network node device D1 that sent the PBN message. The first network node device D1 grants the permission by sending a push button assignment message PBAsgn to the second network node device D3. After receiving this message, the second network node device D3 continues with the technology specific PBC protocol, e.g. in the WLAN case by sending a probe response message including a PBC information element. It is also possible that the second network node device D3 only begins with the running of the technology specific PBC protocol if the assignment message PBAsgn has been received.

If more than one node wants to perform a PBC protocol run, i.e. if more than one node requests the permission to run the protocol, different behaviour may occur:
  cancel push button configuration (error)
  assign the permission to a single node (selection depending e.g., on node priority, receive time, PBC technology)
  if the two or more authenticated second network node devices want to perform the PBC protocol for the same new node (third network node device) wanting to join the network, permission (as above) may be permitted to a single authenticated node (selected on node priority, network characteristics, PBC technology, network Quality of Service (QoS), etc.)
  The request message may include information about the detected node intending to perform a PBC run (e.g. MAC address, frequency band/channel, technology). If multiple permission requests can be associated with a single new node, one assignment is granted, otherwise the whole push button configuration is cancelled.

FIG. 9 shows a Push-Button Configuration session running in the heterogeneous home network HNW with the plurality of network node devices D1 . . . D4, ND, AN interconnected to each other via at least one interface and/or over multiple hops thereby exchanging several Push Button Configuration messages. According to this Push-Button Configuration session two second network node devices, the second network node device D3 and a further second network node device D4 of the heterogeneous home network want to perform a PBC protocol run. Both send a push button request message PBReq to the first network node device D1. As the first network node device D1 receives requests from more than one second network node device (here two, i.e. devices D3 and D4), the push button configuration is aborted (by sending a Push Button Event Abort message, (PBAbort, PBE Abort)). No new device ND, AN is configured so that it cannot participate as a new member network node device in the heterogeneous home network HNW.

The first network node device D1 may wait for a time period after pressing the push button for receiving push button requests. Only after the waiting time period has finished and only if a single push button request has been received, an assignment permission message PBAsgn is sent to the single requesting node of the home network.

Using the described embodiment, it is possible to prevent such an attack from being successful. Multiple ways to handle a detected attack are enabled by the embodiment.

Consider an IEEE P1905.1 network formed of the network node devices D1 . . . D4 in the FIG. 8 and FIG. 9. The network node devices D1 . . . D4 are authenticated IEEE P1905.1 devices which are a part of the heterogeneous home network HNW. The network node devices of the IEEE P1905.1 home network HNW may be connected to each other via multiple hops, and over multiple different technologies.

FIG. 10 shows the structure of the first and second network node devices D1 . . . D4 for processing the extended Push Button Configuration based on the abstraction layer embedded in the IEEE P1905.1-Architecture above the Media Access Control (MAC)-layer and the Physical layer according to FIG. 2. According to FIG. 10 the first and second network node devices D1 . . . D4, in contrast to the network node device NND of FIG. 2, include dedicated component(s) for performing a Push Button Event (PBE) M1, running a Push Button Handshake Procedure (PBHP) M2 and sending/receiving information and/or messages M3. While the component(s) M3 include or incorporate all entities of the IEEE P1905.1-Architecture belonging to the Physical Layer and the component(s) M1 include respectively incorporate the entities of the IEEE P1905.1-Architecture belonging to the Application Layer entities, which are part of the Higher Layer Entities (HLE), the component(s) for running the Push Button Handshake Procedure M2 respectively incorporate all entities in the data- and management plane of the IEEE P1905.1-Architecture from the MAC-Layer including the Abstraction Layer with the IEEE P1905.1 Abstraction Management Entity (ALME) and the corresponding Service Access Points (SAP) via the Logical Link Control (LLC) up to the Higher Layers.

The new device ND is a new IEEE P1905.1 device which should be allowed to join the home network. The attacker node device AN is an attacker node which tries to maliciously join the heterogeneous home network HNW. Let Pid(Device) denote the IEEE P1905.1 EUI-48 abstraction layer identifier of the "Device". In our example Pid(D1)=D1, Pid(D2)=D2, . . . , Pid(D4)=D4, Pid(ND)=ND, and Pid(AN)=AN.

Consider the example in FIG. 8. Here the network administrator wants to introduce the new network node device ND to the existing IEEE P1905.1 home network. Here the administrator triggers a push button event (using either a physical button press, or a virtual push button) at the first network node device D1. This causes the Abstraction Layer Management Entity (ALME) at the first network node device D1 to issue a Push Button Event Notification Message (PBN) as shown in FIG. 8. This PBN message contains a Push Button Event Notification TLV with the fields set as follows: NodeID=Pid(D1), and EventID=0 (random sequential value). The remaining fields of this TLV are not relevant for this example and take on standard values. As this is a relayed multicast message this message will be forwarded to all the network node devices D2 . . . D4 in the IEEE P1905.1 network (i.e. network node devices D2 . . . D4 receive the PBN message). The receipt of this message puts the network node devices D2 . . . D4 in the network in a state ready to initiate a technology specific PBC protocol to add new devices in the network. The network node devices D2 . . . D4 may remain in this state for a limited time after receipt of the PBN message. This time is a variable and can be chosen appropriately, e.g. based on the network size, delay, etc.

The network administrator will then initiate a push button event (via a physical or virtual button) on the new device which should be introduced in the heterogeneous home network HNW (here the new device ND in FIG. 8 and the new device ND in FIG. 9).

Here we can have two cases:
Case1 according to FIG. 8 concerning a scenario without an attacker node device AN which tries to enter the home network at the same time, and
Case2 according to FIG. 9 concerning a scenario with an attacker node device AN which tries to initiate a PBC protocol in parallel to join the network.

In both, Case1 and Case2, the push button event triggered by the new device ND will initiate a technology specific PBC protocol (cf. FIG. 8 and FIG. 9). In both the cases, the second network node device D3 receives the technology specific PBC request and the ALME at the second network node device D3 issues a Push Button Event Request message (PBReq). This message contains a Push Button Event Handshake TLV with the fields set as follows: Request/Assignment Flag=0, SponsorNodeID=Pid(D3), NewNodeID=Pid(ND), EventID=1 (random sequential value), AnnounceNodeID=Pid(D1), EventIDAnnounced=0. The remaining fields of the TLV are not relevant for our example and are assumed to take standard values. The PBReq message is a unicast message which is sent to the node which initiated the PBN message in the IEEE P1905.1 network (in our example, in both, Case1 and Case2, this is the first network node device D1). The first network node device D1 receives the PBReq messages sent by the second network node devices in the network. The first network node device D1 which, in both cases, has initiated the PBN message waits for a time interval before responding with either a Push Button Event Assignment (PBAsgn) message or a Push Button Event Abort (PBAbort) message. The time to wait till response is a variable which can be suitably chosen, either stating from the issue of the PBN message or after receipt of the first PBReq message or some other wait time based on the network parameters.

In Case1 (FIG. 8), after the waiting period, the first network node device D1 has received only a single PBReq message and hence can be sure (also by cross-checking the fields of the PBReq message) that there is no attacker trying to initiate a PBC protocol in parallel. Hence, in Case1, the first network node device D1 responds to the PBReq message from the second network node device D3 by issuing a Push Button Event Assignment message (PBAsgn). The PBAsgn message is a unicast message sent to the initiator of the PBReq message. In Case1 of our example the first network node device D1 issues a PBAsgn message with a Push Button Event Handshake TLV with the fields set as: Request/Assignment Flag=1, SponsorNodeID=Pid(D3), NewNodeID=Pid(ND), EventID=1 (value from the corresponding PBReq), AnnounceNodeID=Pid(D1), EventIDAnnounced=0. The remaining fields of the TLV are not relevant for our example and are assumed to take standard values. The receipt of the PBAsgn message allows the recipient (the second network node device D3) to carry on and execute a technology specific PBC protocol to permit the new device ND to join the network.

In Case2 (FIG. 9), after the waiting period, the first network node device D1 has received more than one PBReq message, as in this case the attacker node device AN has initiated a parallel technology specific PBC (see FIG. 9). The push button event initiated by the attacker node device AN causes the second network node device D4 to issue a PBReq message with a Push Button Event Handshake TLV with the fields set as follows: Request/Assignment Flag=0, SponsorNodeID=Pid(D4), NewNodeID=Pid(AN), EventID=2 (random sequential value), AnnounceNodeID=Pid (D1), EventIDAnnounced=0; the remaining fields of the TLV are not relevant for our example and are assumed to take standard values. The first network node device D1 now receives more than one PBReq message and from the fields in these messages the first network node device D1 can identify which network node devices are the sponsors and which nodes are being sponsored to join the network. This enables the first network node device D1 to make intelligent decisions and detect attacker nodes. In our example the first network node device D1 detects the presence of multiple PBCs in parallel and decides to abort all the ongoing PBCs. It does this by sending a Push Button Event Abort (PBAbort) message. The PBAbort is a relayed multicast message and will be received by all the nodes in the network. The reception of the PBAbort message causes nodes to stop all technology specific PBCs and abort these, thereby preventing new nodes from joining the network. The PBAbort message contains a Push Button Event Abort TLV with the following fields in our example: NodeID=Pid(D1), EventID=0. The remaining fields of the TLV are not relevant for our example and are assumed to take standard values.

Thus as seen from the above example the proposed embodiment enables a heterogeneous home network HNW to be secured against threats where an attacker node may join the network by initiating a PBC in parallel to a regular PBC in the home network.

The following text describes a concrete example implementation of the above mechanism. It is possible to use other messages and TLV fields to convey the same or similar information to achieve the same effect. Especially, some of the device addresses (P1905.1 AL IDs) might be omitted from the different TLVs if they can be derived from other fields of the messages, e.g. the originator of a message might be derived from the source address. First messages are defined, with the important information elements which are contained in these messages.

IEEE 1905.1 Push Button Event Notification (PBE Notification) Message Format

The IEEE P1905.1 Push Button Event Notification is an IEEE P1905.1 Relayed Multicast message.

The following TLV shall be included in this message:
One Push_Button_Event notification TLV (see Table 1)
Push Button Event Notification TLV

TABLE 1

| PUSH_BUTTON_EVENT NOTIFICATION TLV | | | |
|---|---|---|---|
| Field | Length | Value | Description |
| TLV Type | 1 octet | 18 | Push button event notification TLV |
| TLV Length | 2 octets | 08 | # octets in ensuing field |
| NodeID | 6 octets | Valid EUI-48 address | EUI-48 IEEE P1905.1 ID of the originator of the push button event |
| EventID | 2 octets | | EventID |

NodeID (EUI-48 Identifier): The value of NodeID is the EUI-48 unique IEEE P1905.1 identifier of the originator of the push button event. This is the sending node.

EventID (UInteger16): The value of the EventID is a sequential integer selected by the IEEE P1905.1 Device notifying the IEEE P1905.1 Push Button Event. This EventID combined with the NodeID of the sender allows an IEEE P1905.1 device to detect duplicate PBE Notification messages received over multiple IEEE P1905.1 interfaces for the same push button event.

IEEE P1905.1 Push Button Event Request (PBE Request) Message Format

The IEEE P1905.1 Push Button Event Request (PBE Request) Message is an IEEE P1905.1 Unicast message.

The following TLV shall be included in this message:
One Push Button Event Handshake TLV (Table 2) with the Request/Assignment flag (bit 0) set to 0 (Request)

IEEE P1905.1 Push Button Event Assignment (PBE Assignment) Message Format

The IEEE P1905.1 Push Button Event Assignment (PBE Assignment) Message is an IEEE P1905.1 Unicast message.

The following TLV shall be included in this message:
One Push Button Event Handshake TLV (Table 2) with the Request/Assignment flag (bit 0) set to 1 (Assignment)

IEEE P1905.1 Push Button Event Abort (PBE Abort) Message Format

The IEEE P1905.1 Push Button Event Abort (PBE Abort) Message is an IEEE P1905.1 Relayed Multicast message.

The following TLV shall be included in this message:
One Push Button Event Abort TLV (Table 3)

Note: the PBE Assignment and the PBE Request Message may contain two different TLVs. In this case the flag field is not needed, with the other fields having meanings appropriate for the respective messages. The TLVs can be identified by a TLV type, or inferred from the type of the message container carrying the TLVs. Furthermore, the Flag field might be omitted if the distinction between a TLV for PBE request and a TLV for PBE assignment is encoded in some other way, e.g. different TLV Type values (different TLVs) or different Message Identifier values for PBE request and PBE assignment.

Push Button Event Handshake TLV

Table 2 specifies the format of the IEEE P1905.1 Push Button Event Handshake TLV:

TABLE 2

| Push Button Event Handshake TLV | | | |
|---|---|---|---|
| Field | Length | Value | Description |
| TLV Type | 1 octet | <ZZ> | Push Button Event Handshake TLV |
| TLV Length | 2 octets | 23 | # octets in ensuing field |
| Flag | 1 octet | | Bit 0 (Request/Assignment Flag): value 0 = TLV is a Push Button Event Request, value 1 = TLV is a Push Button Event Assignment Bit 1-7: reserved for future use |
| SponsorNodeID | 6 octets | Valid EUI-48 address | EUI-48 IEEE P1905.1 ID of the sponsor device |
| NewNodeID | 6 octets | Valid EUI-48 address | EUI-48 IEEE P1905.1 ID of the node which wants to join the IEEE P1905.1 network |
| EventID | 2 octets | | Event ID |
| AnnounceNodeID | 6 octets | Valid EUI-48 address | EUI-48 IEEE P1905.1 ID of the sender of the corresponding PBE Notification message |

TABLE 2-continued

Push Button Event Handshake TLV

| Field | Length | Value | Description |
|---|---|---|---|
| EventIDAnnounced | 2 octets | | Event ID of the corresponding Push Button Event Notification TLV |

Flag (Bitmap): The value of subfield Request/Assignment Flag (bit 0) of the field Flag is used to identify whether the TLV represents a Push Button Event Request or a Push Button Event Assignment. A value 0 for Bit 0 implies that the TLV is a Push Button Event Request, a value 1 for bit 0 implies TLV is a Push Button Event Assignment. Bits 1-7 are reserved for future use.

SponsorNodeID (EUI-48 Identifier): The value of SponsorNodeID is the EUI-48 unique IEEE P1905.1 identifier of the sponsor node. This is the authenticated IEEE P1905.1 node which wants to sponsor a new node wanting to join the IEEE P1905.1 network. The sponsor node is the sender of the PBE Request message or the recipient of the PBE Assignment message. This is indicated by the value of the Request/Assignment Flag.

NewNodeID (EUI-48 Identifier): The value of NewNodeID is the EUI-48 unique IEEE P1905.1 identifier of the node wanting to join the P1905.1 network and which is being sponsored by the authenticated node with ID AuthNodeID.

EventID (UInteger16): The value of the EventID is a sequential integer selected by the IEEE P1905.1 Device notifying the IEEE P1905.1 Push Button Event Request (sponsor device).

If this TLV is a PBE Assignment then the value of the EventID is the EventID associated with the IEEE P1905.1 Push Button Event Request that triggered this IEEE P1905.1 Push Button Event Assignment. It is taken from the EventID field of the Push Button Event Handshake TLV of the IEEE P1905.1 Push Button Event Request message that triggered this IEEE P1905.1 Push Button Event Assignment message.

This EventID combined with the IEEE P1905.1 AL ID of the sender and the IEEE P1905.1 AL ID of the node being sponsored allows an IEEE P1905.1 Device to detect duplicate Push Button Event Request/Assignment messages received over multiple IEEE P1905.1 interfaces for the same tuple of nodes.

AnnounceNodeID (EUI-48 Identifier): The value of AnnounceNodeID is the EUI-48 unique IEEE P1905.1 identifier of the node that sent (originated) the corresponding Push Button Event Notification message. This is the authenticated IEEE P1905.1 node which generated the Push Button Event. The value of AnnouceNodeID can be taken from the NodeID field of the received Push_Button_Event Notification TLV.

EventIDAnnounced (UInteger16): The value of the EventIDAnnounced is the EventID assigned to the push button event by the IEEE P1905.1 device that generated the push button event and sent the Push Button Event Notification message. The value of EventIDAnnounced shall be taken from the EventID field of the received Push_Button_Event Notification TLV.

This EventIDAnnounced combined with the IEEE P1905.1 AL ID of the sender of the Push Button Event Notification message (AnnounceNodeID) allows an IEEE P1905.1 Device to detect multiple Push Button Event Request/Assignment messages for the same push button event notification.

Push Button Event Abort TLV

Table 3 specifies the format of the IEEE P1905.1 Push Button Event Abort TLV:

TABLE 3

Push Button Event Abort TLV

| Field | Length | Value | Description |
|---|---|---|---|
| TLV Type | 1 octet | <ZZ> | Push Button Event Abort TLV |
| TLV Length | 2 octets | 8 | # octets in ensuing field |
| NodeID | 6 octets | Valid EUI-48 address | EUI-48 IEEE P1905.1 ID of the sender (originator of push button event) |
| EventID | 2 octets | | Event ID of the corresponding Push Button Event Notification |

NodeID (EUI-48 Identifier): The value of NodeID is the EUI-48 unique IEEE P1905.1 identifier of the sender device which aborts all the PBE Requests it has received in case of multiple parallel requests. This is the originator device of the push button event which had sent the PBE Notification message allowing the authenticated IEEE P1905.1 devices to move into the mode permitting them to start the process for sponsoring new devices for entering the IEEE P1905.1 network.

EventID (UInteger16): The value of the EventID is the EventID associated with the push button event that has to be cancelled. It is the same EventID that has been distributed in the EventID field of the IEEE P1905.1 Push Button Event Notification TLV of the PBE Notification that announced this push button event.

This EventID combined with the NodeID of the sender allows a IEEE P1905.1 Device to detect duplicate Push Button Event Abort messages received over multiple IEEE P1905.1 interfaces.

IEEE P1905.1 PBC (Push Button Configuration) Setup Method

The IEEE P1905.1 PBC method works between two IEEE P1905.1 Devices on the same IEEE P1905.1 Network, even when these two devices do not include an IEEE P1905.1 interface of the same underlying network technology if they are connected by a device with the same underlying network technologies.

An example of the IEEE P1905.1 extended PBC method is illustrated in FIG. 8. It shows the working of a successful PBC handshake permitting the new IEEE P1905.1 device to join the network. The IEEE P1905.1 devices D1 . . . D4 have been authenticated and belong to the same IEEE P1905.1 network. IEEE P1905.1 devices might be interconnected to each other via one or more interfaces using different technologies and over multiple hops. Arrows between the nodes indicate the flow of messages among the nodes.

The new IEEE P1905.1 device ND wants to join the network. In order to permit an authenticated IEEE P1905.1 device in a IEEE P1905.1 network to allow (to sponsor) a new node to join the network it needs to receive a corresponding Push Button Event Assignment message.

IEEE P1905.1 Push Button Event Handling:

If the physical or logical PBC button is pushed on an IEEE P1905.1 Device and if an underlying network technology specific Push Button Configuration sequence is not currently being performed on any of the network interfaces of this IEEE P1905.1 Device, then a Push Button Event is triggered on this IEEE P1905.1 Device.

A virtual or physical Push Button Event at an authenticated P1905.1 device triggers the sending of the PBE Notification message which is then relayed to all the P1905.1 devices in the P1905.1 network. In FIG. 8, the push button event occurred at the first network node device D1. The NodeID field of the Push_Button_Event Notification TLV shall contain the EUI-48 unique IEEE P1905.1 identifier of the authenticated IEEE P1905.1 device where the virtual or physical push button event occurred. The Event ID field shall be set as described in the Push Button Event Notification TLV (sequential integer) in order to uniquely identify this push button event. Furthermore, the orginator of the push button event, that is, the sender of the PBE Notification message, shall initialize its Push Button Event Timer to p1905dot1_PushButtonEventActiveDuration and shall start it.

If a Push Button event is triggered on an unauthenticated IEEE P1905.1 Device, then the IEEE P1905.1 Control Entity shall initialize the underlying network technology specific Push Button Configuration sequence on the IEEE P1905.1 interfaces supporting Push Button Configuration methods.

IEEE P1905.1 Push Button Event Notification Handling:

If an IEEE P1905.1 Control Entity of an authenticated device of the IEEE P1905.1 network receives an IEEE P1905.1 Push Button Event Notification message, then it shall:

1) If an underlying network technology specific Push Button Configuration sequence is currently being performed on any of the network interfaces of the device, then ignore the message.
2) Check whether this PBE Notification message is a duplicate reception of the announcement of the same push button event by comparing the NodeID and EventID of the Push_Button_Event Notification TLV with NodeID and EventID of the Push_Button_Event Notification TLVs of previously received PBE Notification messages. If it is a duplicate reception, the PBE Notification message is discarded.
3) Initialize its Push Button Event Timer to p1905dot1_PushButtonEventActiveDuration and shall start it, if it is the first reception of the push button event notification. Only nodes with an active Push Button Event Timer are allowed to issue PBReq Messages and to perform a MAC layer specific Push Button Configuration protocol.
4) Propagate the PBE Notification message according to the Relayed Multicast Reception Procedures for control messages. The fields of the Push_Button_Event Notification TLV are unchanged.

When the new IEEE P1905.1 device ND wants to join the IEEE P1905.1 network (this is triggered by a virtual or physical push button event at the new IEEE P1905.1 device ND) it triggers the Push Button protocol of the lower layer on its interfaces. On receipt of the lower layer Push Button at an authenticated device in the IEEE P1905.1 network (in FIG. 8, the second IEEE P1905.1 network node device D3) the receiving IEEE P1905.1 device processes this lower layer request only if its Push Button Event Timer is active, and if it has not already processed a lower layer Push Button event from the new device. On receipt of the lower layer Push Button event, the sponsor device (that is, the authenticated second IEEE P1905.1 network node device D3 with active Push Button Event Timer sponsoring the new device) shall 1) Sent a PBReq message to the authenticated IEEE P1905.1 device that announced the push button event that activated the Push Button Event Timer (that is, the originator of the push button event). The fields in the Push Button Event Handshake TLV of the PBReq message are set according to the description earlier in the text:

Request/Assignment Flag is set to 0 indicating that the Push Button Event Handshake TLV is a PBE request.

SponsorNodeID is the IEEE P1905.1 AL ID of the sponsor device, that is the second network node device D3 sponsoring the new device ND.

NewNodeID is the IEEE P1905.1 AL ID of the new device ND that wants to join the IEEE P1905.1 network.

EventID is a unique, sequential integer that uniquely identifies this PBE request of this sponsor device.

AnnounceNodeID is the IEEE P1905.1 AL ID of the originator of the Push Button Event to which this PBE request is responding. The AnnounceNodeID is taken from the NodeID of the corresponding Push Button Event Notification TLV.

EventIDAnnounced is the event ID of the Push Button Event notification to which this PBE request is responding. The EventIDAnnounced is taken from the EventID of the corresponding Push Button Event Notification TLV.

2) Wait with the continuation of the MAC layer specific Push Button Configuration protocol until it receives a PBAsgn message in response to this PBReq message.

On receipt of the PBReq, the originator of the push button event shall reply with a PBAsgn message addressed to the sponsor node if no other PBReq with AnnounceNodeID being the IEEE P1905.1 AL ID of the receiver of the PBReq has been received in parallel for a different new device (other than the new device ND in FIG. 8). The fields in the Push Button Event Handshake TLV of the PBAsgn message are set as described earlier.

Request/Assignment Flag is set to 1 indicating that the Push Button Event Handshake TLV is a PBE assignment.

SponsorNodeID is the IEEE P1905.1 AL ID of the sponsor device, that is the second network node device D3 sponsoring the new device ND. It is the same value as in the corresponding Push Button Event Handshake TLV of the corresponding PBE request.

NewNodeID is the IEEE P1905.1 AL ID of the new device ND that wants to join the IEEE P1905.1 network. It is the same value as in the corresponding Push Button Event Handshake TLV of the corresponding PBE request.

EventID is a unique, sequential integer that uniquely identifies the corresponding PBE request of the sponsor device. This PBE request is permitted with this PBE assignment.

AnnounceNodeID is the IEEE P1905.1 AL ID of the originator of the Push Button Event to which this PBE assignment is responding. The AnnounceNodeID is taken from the NodeID of the corresponding Push Button Event Notification TLV. In fact, it is the IEEE P1905.1 AL ID of the originator/sender of the PBE Assignment.

EventIDAnnounced is the event ID of the Push Button Event notification to which this PBE request is responding. The EventIDAnnounced is taken from the EventID of the corresponding Push Button Event Notification TLV.

To ensure that the originator of the push button event receives all the PBReq messages issued in the network it shall wait for p1905dot1_PushButtonMessagesWalkTime after sending the PBE Notification message before being able to send the first PBAsgn message. A longer or shorter waiting time is possible. The waiting time can also be dynamically adapted. If multiple PBReq messages are received sponsoring the same new device then one of the senders of these PBReq messages is chosen as the sponsor device and notified using the PBAsgn message addressed to the selected sponsor device.

If multiple PBReq messages are received sponsoring different new device then a PBAbort message shall be sent by the originator of the push button event to at least all IEEE P1905.1 devices from which the originator of the push button event received a PBReq message, thereby aborting any underlying MAC layer PBC protocols (cf. FIG. 9), where ND and AN are two devices wanting to join the IEEE P1905.1 network, IEEE P1905.1 network node devices D1 . . . D4 are currently authenticated devices in the IEEE P1905.1 network). The Push Button Event Abort TLV has the same values as the corresponding Push Button Event Notification TLV.

If p1905d0t1_PushButtonMessagesWalkTime <p1905dot1_PushButtonEventActiveDuration, it might happen, that another PBE Request is received at the originator of the Push Button Notification after the sending the PBE Assignment. A PBE Abort message is also sent in this case, aborting or even rolling back any unassigned/not yet permitted and assigned/permitting lower layer Push Button Configuration protocol runs.

Other semantics for handling multiple simultaneous PBCs are allowed and possible, as described earlier in this text.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for running Push-Button configuration sessions within a heterogeneous network with a plurality of network node devices interconnected via at least one of an interface and multiple hops, the method comprising:
   triggering a master network node device in response to sensing a first Push-Button-Event assigned to the master network node device;
   sending a notification message from the master network node device to a second network node device, wherein the notification message includes information regarding the first Push-Button-Event and the second network node device has previously been authenticated for the network;
   triggering a third network node device to initiate a Push-Button Configuration handshake procedure with a second Push-Button-Event assigned to the third network node device;
   running the Push-Button Configuration handshake procedure between the third network node device and the master network node device indirectly using the second network node device wherein the third network node device conveys information to start a Push Button Configuration Protocol to the second network node device and the second network node device requests permission from the master network node device to run the Push Button Configuration Protocol; and
   delivering a response message from the master network node device to the second network node device;
   wherein the response comprises (a) a permission message or an assign message to proceed with the Push-Button Configuration Protocol, or (b) a rejection message to stop the Push-Button Configuration Protocol.

2. The method according to claim 1, further comprising: determining whether Push-Button Configuration handshake procedures of more than one third network node device are running indirectly with the first network node device via additional network node devices such that more than one additional network node devices requests to run the "Push-Button Configuration"-Protocol with the third network node device and, if so:
   either cancelling the current Push-Button Configuration session, because of an error due to the multiple request of running each the Push-Button Configuration-Protocol;
   or assigning the permission to the second node device, whereby the selection of the second node device depends at least in part on a priority assigned to each of the additional node devices, a receive time of each request to start the Push-Button Configuration-Protocol at the first node, or a Push-Button Configuration technology being used.

3. The method according to claim 1, further comprising: determining whether the Push-Button Configuration handshake procedure of one third network node device is running indirectly with the first network node device via the at least one second network node device such that more than one of the second network node devices requests to run the "Push-Button Configuration"-Protocol with the one third network node device; and
   if so, assigning the permission to a selected single second node device, whereby the selection of the single second node device depends at least in part on a priority assigned to each of the second node devices, network characteristics, a Push-Button Configuration technology being used, or a Quality of Service of the network.

4. The method according to claim 1, wherein the request message with which the run of the Push-Button Configuration-Protocol is requested includes information about the second network node device requesting the start of the "Push-Button Configuration"-Protocol.

5. The method according to claim 1, wherein the request message with which the run of the Push-Button Configuration-Protocol is requested includes at least one of: a MAC-Address, a frequency band, a channel, and a technology used by the second network node device.

6. The method according to claim 1, further comprising waiting, after the triggering by the first Push-Button-Event, for a first time period before sending the assign message or the abort message;
   wherein a duration of the first time period is selected based at least in part on either starting from the issue of the notification message, or after the first receipt of the request message, or some other wait time based on network parameters.

7. The method according to claim 2, further comprising maintaining the plurality of network node devices for a second time period after the notification message was received, in a state ready to initiate the run of the "Push-Button Configuration" Protocol, wherein the second time period is variable and based at least in part on either a network size or a network delay.

8. The method according to claim 1, wherein the message contains message-specific tag-length-value (TLV)-data.

9. A master network node device for running Push-Button Configuration sessions within a heterogeneous network with a plurality of additional network node devices interconnected via at least one of an interface and multiple hops, the master network node device comprising a processor configured to:
perform a first Push-Button-Event;
send and receive information regarding the first Push-Button-Event to a second network node device, wherein the second network node device has been previously authenticated for the network;
execute a Push-Button Configuration handshake procedure with an unauthenticated third network node device indirectly using the second network node device wherein the unauthenticated third network node device conveys information to start a Push-Button Configuration Protocol to the second network node device and the second network node device conveys a request message to the master network node device requesting to run the Push-Button Configuration Protocol;
wherein the Push-Button Configuration handshake procedure is triggered by receipt of Push-Button Configuration Protocol Messages indicating a second Push-Button-Event assigned to the third network node device; and
deliver a response message to the second network node device;
wherein the response message comprises either (a) a rejection message to stop the Push-Button Configuration Protocol or (b) a permission message or an assign message to proceed with the Push-Button Configuration Protocol.

10. A network node device for running Push-Button Configuration sessions within a heterogeneous network including a master network node device and a plurality of additional network node devices previously authenticated for the network, the plurality of additional network node devices interconnected via at least one of an interface and multiple hops, the network node device comprising a processor configured to:
perform a first Push-Button Event;
send and receive a notification message to the master network node device in response to the Push-Button Event;
wherein the information includes a notification message related to the Push-Button Event; and
run a Push-Button Configuration handshake procedure in concert with an unauthenticated network node device, wherein the Push-Button Configuration handshake procedure is triggered by receipt of a notification message indicating a second Push-Button Event assigned to the unauthenticated network node device;
send a request message to the master network node device including information to start a Push-Button Configuration Protocol received from the unauthenticated network node device;
receive an authentication message from the master network node device, the authentication message including one of: permission information to join the network; instructions to proceed with the Push-Button Configuration handshake procedure, or a rejection; and
start a Push-Button Configuration Protocol in response to information received from the unauthenticated network node device or accomplish a time triggering- or time monitoring-based signalling of the permission information or the rejection information.

11. The network node device according to claim 9, further comprising the processor configured to:
receive a request message via the second network node device, the request message including a request to run the Push-Button Configuration handshake procedure; and
transmit the permission message or the rejection message to the second network node device.

12. The network node device according to claim 11, further comprising the processor configured to:
if the network node device receives request messages from more than one second network node device related to a Push-Button-Event assigned to the third network node device, either:
(a) cancel a current Push-Button Configuration handshake procedure and register an error based on multiple requests, or
(b) assign a permission to a single one of the second network node devices based on: (a) a priority assigned to the second network node devices, (b) a receive time associated with each request message received, or (c) a Push-Button Configuration technology used at the network node device.

13. The network node device according to claim 11, further comprising the processor configured to:
if the network node device receives request messages from more than one second network node device related to a Push-Button-Event assigned to the third network node device, assign a permission to a single one of the second network node devices based on: (a) network characteristics, or (b) a quality of service of the network.

14. The network node device according to claim 11, wherein the request message includes information about the second network node device including at least one of a MAC-address, a frequency band or channel, and a technology used by the second network node device.

15. The network node device according to claim 11, further comprising the processor configured to wait for a first time period after the first Push-Button-Event before delivering the rejection message or the permission message, wherein a duration of the first time period is based on at least one of sending the information regarding the first Push-Button-Event, receipt of the information regarding the first Push-Button-Event, or network parameters.

16. The network node device according to claim 9, wherein the information regarding the first Push-Button-Event includes message specific tag-length-value (TLV)-data.

17. A network node device for running Push-Button Configuration sessions within a heterogeneous network including a plurality of additional network node devices previously authenticated for the network, the plurality of additional network node devices interconnected via at least one of an interface and multiple hops, the network node device comprising a processor configured to:
receive a notification message triggered by a first Push-Button-Event assigned to a first authenticated network node device;

the notification message sent by the first authenticated network node device to multiple authenticated network node devices of the plurality of additional network node devices;

run a Push-Button Configuration handshake procedure with the first authenticated network node device in response to an initiation request from an unauthenticated network node device;

wherein the unauthenticated network node device triggers a second Push-Button-Event to request authentication by the Push-Button Configuration handshake procedure; and receive a permission message for the unauthenticated network device to join the network or a rejection message denying the unauthenticated network node device permission to join the network from the first authenticated network node device and sending that message to the unauthenticated network node device;

receive information related to the Push-Button Configuration-Protocol from the unauthenticated network node device;

transmit a request message to the first authenticated network node device to run the Push-Button Configuration-Protocol; and receive a reply message from the first authenticated network node device comprising an assign message with: permission for the unauthenticated network node device to loin the network or instructions to reject the unauthenticated network node device.

18. The network node device according to claim 17, wherein the request message includes information regarding the network node device.

19. The network node device according to claim 17, wherein the processor is further configured to remain prepared to run the Push-Button Configuration-Protocol for a defined time period based on a network size or a network delay.

20. The network node device according to claim 17, wherein the request message includes specific tag-length-value (TLV)-data.

* * * * *